United States Patent [19]

Mutschler

[11] 3,804,540

[45] Apr. 16, 1974

[54] NIB OF PLASTICS MATERIAL FOR TUBULAR NIB-TYPE PENS

[75] Inventor: Otto Mutschler, Heidelberg, Germany

[73] Assignee: J. S. Staedtler, Nurnberg, Germany

[22] Filed: Dec. 1, 1972

[21] Appl. No.: 311,125

[30] Foreign Application Priority Data
Dec. 6, 1971 Germany............................ 2160387

[52] U.S. Cl.............................. 401/265, 346/140 A
[51] Int. Cl............................................... B43k 1/06
[58] Field of Search........................... 401/258–260, 401/265; 316/140

[56] References Cited
UNITED STATES PATENTS
3,561,880   2/1971   Bok.................................... 401/258

*Primary Examiner*—Lawrence Charles
*Attorney, Agent, or Firm*—Hane, Baxley & Spiecens

[57] ABSTRACT

In a nib for draftsman's pens and the like of the type employing a nib tube mounted with a clamping or friction fit in a hole in a metallic sleeve surrounding a plastic part of the nib.

3 Claims, 2 Drawing Figures

NIB OF PLASTICS MATERIAL FOR TUBULAR NIB-TYPE PENS

BACKGROUND OF INVENTION

1. Field to which Invention Relates

The present invention relates to a nib of plastic material for tubular nib-type pens, more especially draftman's pens, which are encased in an outer metallic sleeve and have the tube of the nib arranged at the tip.

2. The Prior Art

The metallic sleeves of such nibs serve for connecting the tubular nib-type pen with a draftman's or lettering pen device, and the metal sleeve, surrounding the end section of reduced diameter of the nib takes up the clamping force of a corresponding clamping sleeve. This sleeve if it were directly to act on the fragile terminal portion of reduced diameter of the nib of plastic material might easily lead to the nib being fractured.

In the case of previously proposed nibs of plastic material for tubular nib-type writing devices, the hole adapted to receive the tube of the nib is provided in the end section of reduced size of the nib of plastic material. The production of such nibs is, however, difficult, since due to the properties of the plastic material suitably dimensioned holes cannot be made with sufficient accuracy and either lead to a loose fit and poor centering for the tube of the nib in cases where the diameter is too large, or if the diameter should be slightly too small cause strain or stress cracks due to the clamping forces on the inserted nib tube and these cracks can lead to a failure of the holding section of the nib tube.

In the case of very fine nib tubes the production of the hole for receiving the nib tube in the nib of plastic material leads to great difficulties since the core, necessary for this purpose, in the injection mold is then extraordinarily narrow as well. For this purpose in the case of nibs for very thin nib tubes attempts have already been made to make the hole for receiving the tube in the plastic material at first so as to be larger than the external diameter of the nib tube and then insert a metallic sleeve into this oversized receiving hole, the metallic sleeve having a bore diameter which corresponds to the external diameter of the nib tube.

Furthermore, in the case of previously proposed nibs, in which the receiving hole for the nib tube is provided in the end plastic section of the nib at the end of the hole an abutment is necessary for the nib tube so that when the nib tube is pressed against material to be written upon it cannot be pushed back into the hole. This slipping back into the hole cannot be taken up or prevented by the gripping action exerted on the tube in the hole since in the case of an excessively tight fitting of the tube of the nib, cracks will occur in the plastic material. The provision of such abutments in the hole for receiving the nib tube which in any case is extremely narrow, is, however, difficult and complicated in actual production.

SUMMARY OF INVENTION

One object of the present invention is to provide a nib, which can be simply produced of plastic material for tubular nib-type pens whereby the difficulties and disadvantages of known arrangements are avoided. In order to obtain this object there is provided, in accordance with one aspect of the invention, a nib of the above type in which the metal sleeve extends axially beyond the front end of the nib and in the overlapping section resulting in an axial hole, there is provided a centered attachment for the nib tube.

In this respect the invention is based upon the discovery that a hole made for the insertion of the nib tube can be made substantially more accurately in a metallic sleeve than in the plastic material nib itself. There is substantially no additional complexity as compared with the manufacture of prior art nibs since it is possible to use for this purpose the metallic sleeve which has also been used in the prior art for holding the tubular nib-type pen device. This sleeve must only be made long enough to accommodate the receiving hole for the nib tube in its front part.

In contrast to the unsatisfactory attempts which have been made to produce the receiving hole in the plastic larger with thin nib tubes than the external diameter of the nib tube and to provide an additional metallic sleeve in the receiving hole of the nib which for its part receives the actual nib tube, the present invention offers the advantage that difficulties as regards an axially aligned fit of the tube can be avoided without any great expense. Moreover, in the case of the construction in accordance with the invention coping with one aspect of the problem of centering does not lead to another aspect of the problem causing difficulties as regards the additional sleeve in the receiving hole, and in fact the difficulty is completely eliminated of.

It is advantageous in accordance with the invention to construct the receiving hole in the metallic sleeve so that the nib tube can be inserted into the hole of the metallic sleeve with a tight fit whereby it is not necessary to provide an abutment for preventing the nib tube being pushed into the channel. As a result the above-mentioned production difficulties do not occur. Naturally for special applications such a terminal abutment can be provided additionally. However, this does not lead to any particular difficulties in the case of nib tubes with a relatively large diameter. Instead of a tight fit of the nib tube in the hole of the metallic sleeve, the nib tube can also be fixed in the hole by adhesive or by solder.

Due to this feature of a non-positive attachment of the metallic sleeve on the thicker and stronger part of the container, the end section of reduced size which extends into the metallic sleeve and is surrounded by it, the nib of plastic material is protected against bending forces. Such forces may occur when the web is incorrectly fitted into the holding sleeve of a drawing or writing instrument. The danger of breaking off the end section of the nib of plastic material due to careless use is thus practically completely excluded.

The invention will now be explained with further details and features with reference to the embodiment shown diagrammatically in the accompanying drawing.

FIG. 1 is an axial plan view of the metallic housing of a nib in accordance with the invention.

FIG. 2 is a side view, partially sectioned on the line II—II of FIG. 1, of a nib in accordance with the invention with the metallic sleeve in accordance with FIG. 1.

DESCRIPTION OF THE DRAWING

The metallic sleeve 1 has a rear hole 4 of comparatively large diameter into which the end section 9 of reduced diameter of a nib 7 of plastic material, fits. Reference numeral 10 indicates the channel or duct for the ink. The metallic part of the nib is provided with arms 2, 3, which on molding of the plastic material abut against the nib 7 in the reservoir 8 and serve as an anchoring connection between the plastic part and the metallic sleeve. The annular sector shoulders 3 of the arms 2 serve as an abutment during molding of the shank 8, 9 of plastic material on the sleeve in accordance with the invention. With the exception of the annular sector shoulders 3 which lie in the same plane as the bottom of the shank and the bore of the receiving hole which is internally covered by the nib tube, the hole of the sleeve of metal being covered with plastic material. As a result, there can be no direct contact between the sleeve and the ink, for instance India ink. This has the advantage that the sleeve does not have to be made of corrosion resistant V2 A steel but can be made of a cheaper material, for example brass. It is also possible as an additional feature to provide a coating on the exposed end surfaces of the annular sector shoulders 3.

The nib tube 11 is inserted into the receiving hole of the metallic sleeve until its end partly extends inwards into the neck 9 of plastic material so that in every case the bore of the hole 5 cannot come into direct contact with the India ink.

Figure 1:
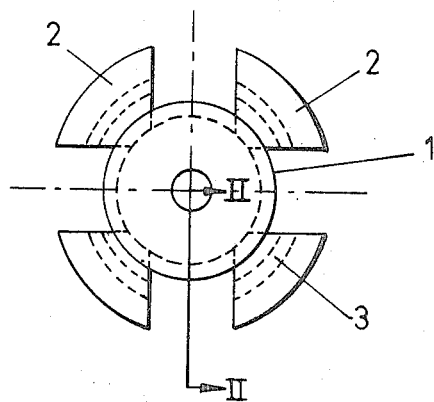
Figure 2:
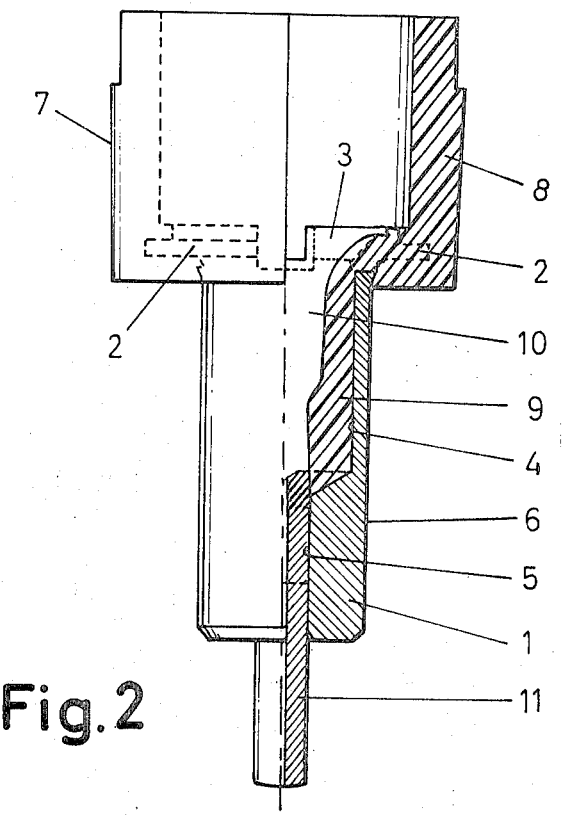

In the part extending across the section 9, of the metallic sleeve, an axial receiving hole 5 is provided for a nib tube 11 which is so constructed that the nib tube 11 is held in an accurately centered manner with a clamping or friction fit in this hole 5 so that the terminal abutment necessary in prior art constructions for the nib tube in the hole in a plastic material part is not required for the rear end of the nib tube 11.

The accurately turned cylindrical outer surface 6 of the metallic sleeve 1 forms the abutment surface for fixing or clamping a tubular nib pen device with a nib in accordance with the invention in the corresponding gripping sleeves or gripping jaws of a draftman's or lettering pen.

The nib construction in accordance with the invention furthermore has the particular advantage that a tubular nib pen device with such a nib can readily be used in computer controlled plotting or writing devices as in this case there is a direct electrical connection between the nib tube and the external holding sleeve so that an electrical contact with the nib tube can be provided by the provision of an electrically conducting means on the outer periphery 6 of the metallic sleeve 1.

The invention is not limited to the embodiment shown. Thus, more particularly, the channel 10 for the ink can have a smaller or larger diameter than the receiving hole 5 for the nib tube 11 and the anchoring of the metallic sleeve in the nib of plastic material can be made in any desired fashion instead of with the four lateral arms 2, 3 shown.

I claim:

1. In a nib partly made of plastics material for tubular nib-type pen devices, and comprising a surrounding outer metallic sleeve and a nib tube arranged at the tip of nib, the improvement which resides in that the metallic sleeve extends axially beyond a front end of the nib and in the resulting overlapping part there is an axial hole serving for centered attachment of the nib tube.

2. The structure as set forth in claim 1, in which the nib tube is mounted with a frictional fit in the receiving hole of the metallic sleeve.

3. The structure as set forth in claim 1, in which the metallic sleeve extends beyond the receiving hole of the metallic sleeve as far as a front end of the plastic material part of the nib and makes direct contact between the metallic sleeve and the writing means.

* * * * *